United States Patent
Richardson, IV et al.

(10) Patent No.: US 12,028,339 B2
(45) Date of Patent: Jul. 2, 2024

(54) SYSTEMS AND METHODS FOR PROVIDING VERIFIABLE CREDENTIALS

(71) Applicant: Change Healthcare Holdings, LLC, Nashville, TN (US)

(72) Inventors: Deas M. Richardson, IV, Mount Pleasant, SC (US); Sam Birky, Nashville, TN (US)

(73) Assignee: Change Healthcare Holdings, LLC, Nashville, TN (US)

( * ) Notice: Subject to any disclaimer, the term of this patent is extended or adjusted under 35 U.S.C. 154(b) by 351 days.

(21) Appl. No.: 17/531,111

(22) Filed: Nov. 19, 2021

(65) Prior Publication Data

US 2023/0164143 A1    May 25, 2023

(51) Int. Cl.
  *H04L 9/40*    (2022.01)
(52) U.S. Cl.
  CPC ............... *H04L 63/0876* (2013.01)
(58) Field of Classification Search
  CPC .................................................. H04L 63/0876
  USPC ............................................. 726/5, 6, 18, 21
  See application file for complete search history.

(56) References Cited

U.S. PATENT DOCUMENTS

| | | | |
|---|---|---|---|
| 11,432,149 B1* | 8/2022 | Dhanoa | H04W 12/068 |
| 2019/0319939 A1* | 10/2019 | Hamel | G06F 21/33 |
| 2020/0167622 A1* | 5/2020 | Sinha | G06Q 20/227 |
| 2022/0398299 A1* | 12/2022 | Murdoch | H04L 9/3234 |

* cited by examiner

*Primary Examiner* — Liang Che A Wang
(74) *Attorney, Agent, or Firm* — Meunier Carlin & Curfman LLC (57) ABSTRACT

In an embodiment, systems, methods, and computer-readable mediums for creating applications that issue and verify verifiable credentials are provided. An issuer may desire to create a verifiable credential for certain parties which attest to some fact about which the issuer can speak authoritatively. The issuer provides information about the desired verifiable credential to a credential creating application that creates verification information for the verifiable credential and publishes the verification information to a public datastore such as a blockchain or distributed ledger. The creation application then creates a first application that can be used by the issuer to generate verifiable credentials according to the provided structure and purpose, and a second application that can be used by the verifiers to verify any credentials that they receive from holders using the published verification information. The verifiers may provide some benefit to the holders in response to verifying the credentials.

20 Claims, 5 Drawing Sheets

SYSTEMS AND METHODS FOR PROVIDING VERIFIABLE CREDENTIALS

BACKGROUND

Employers frequently offer benefits which touch upon private or sensitive matters related to an employee's life, such as weight loss, nutritional support, smoking cessation, or mental health services. This creates friction in many cases; the employer wants lower medical insurance costs (the ostensible result of employees utilizing the sponsored benefit), and the employee may want the service but not at the cost of privacy.

Existing benefits solutions require too much knowledge to be in the hands of the employer or the service provider. Eligibility rosters either expose non-participant information to service providers or require a participant to divulge the fact of his/her participation to the employer. Ideally, the solution should only reveal information about a participant at his/her own discretion but allow for contractual agreements to function normally.

SUMMARY

In an embodiment, systems, methods, and computer-readable mediums for creating applications that issue and verify verifiable credentials are provided. An issuer may desire to create a verifiable credential for certain parties which attest to some fact about which the issuer can speak authoritatively. For example, an employer may attest to the employment status of its employees or their eligibility for employer sponsored benefits plan participation in the form of verifiable credentials which can be independently verified by one or more unrelated verifiers. The issuer provides information about the desired verifiable credential including structure and purpose to a credential creating application that creates verification information for the verifiable credential and publishes the verification information to a public datastore such as a blockchain or distributed ledger. The creation application then creates a first application that can be used by the issuer to generate verifiable credentials according to the provided structure and purpose, and a second application that can be used by the verifiers to verify any credentials that they receive from holders using the published verification information. The verifiers may provide some benefit to the holders in response to verifying the credentials. For example, upon verifying eligibility status for an employer-sponsored benefit plan, a verifier might enable a provider to render services associated with the plan under its terms.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate systems and methods for creating applications that generate and verify verifiable credentials. Together with the description, the figures further serve to explain the principles of the systems and methods for creating applications that generate and verify verifiable credentials described herein and thereby enable a person skilled in the pertinent art to make and use the systems and methods for creating applications that generate and verify verifiable credentials.

DETAILED DESCRIPTION

Figure 1:
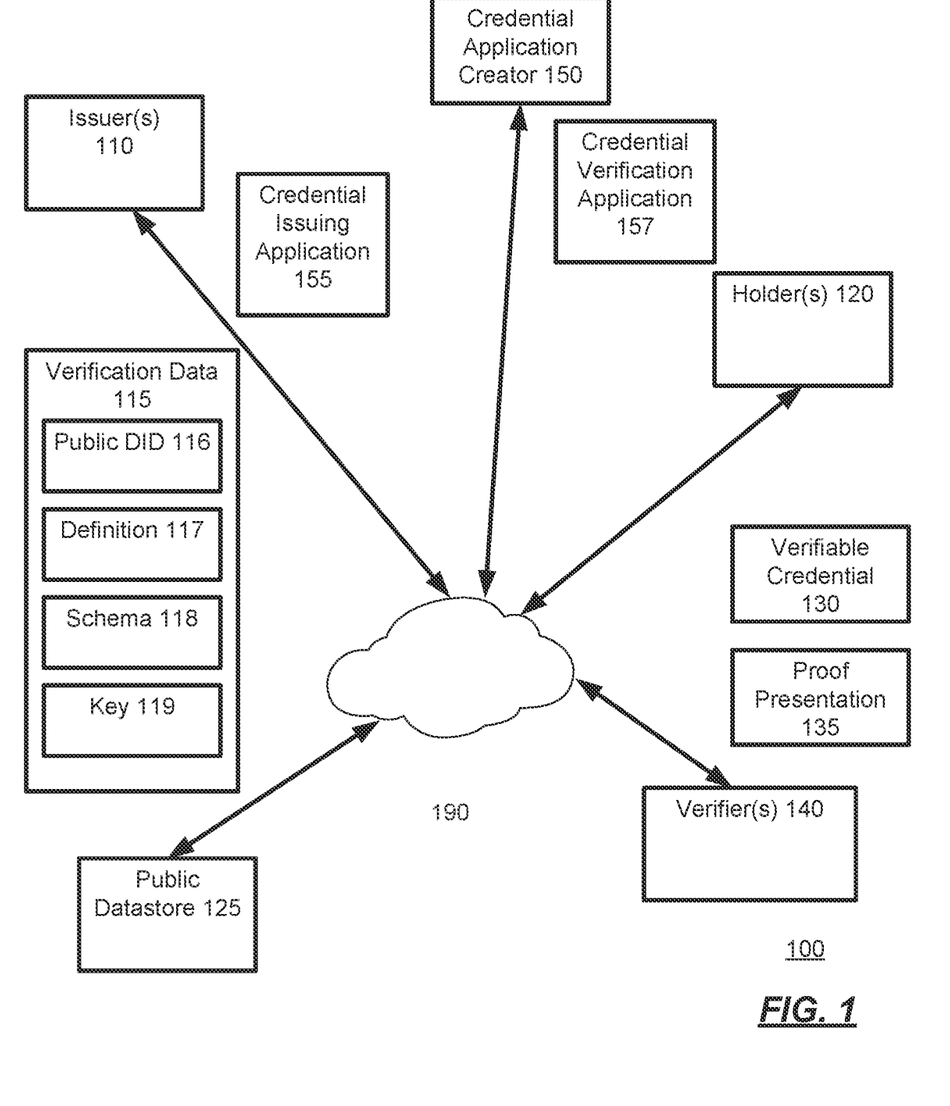
FIG. 1 is an example environment for generating and using verifiable credentials and for creating applications that can issue and verify verifiable credentials.

FIG. 1 is an example environment for generating and using verifiable credentials and for creating applications that can issue and verify verifiable credentials. As shown, the environment 100 includes one or more issuers 110, holders 120, and verifiers 140 communicating through a network 190. The network 190 may include a combination of public and private networks. Each of the issuers 110, holders 120, and verifiers 140 may be implemented using one or more general purpose computing devices such as the computing device 500 illustrated with respect to FIG. 5.

The environment 100 may allow an issuer 110 to generate and provide a verifiable credential 130 to a holder 120. The holder 120 may then provide the verifiable credential 130 to a verifier 140 for verification. Once verified, the verifier 140 may provide one or more services, benefits, statuses, or goods to the holder 120. As will be described further below, the verifiable credential 130 solves the privacy issues described above in that the verifier 140 is able to verify the verifiable credential 130 provided by the holder 120 without involving the issuer 110.

In some embodiments, the verifiable credential 130 may be generated by an issuer 110 and may serve as proof that the holder 120 of the verifiable credential 130 performed some task, met some requirements, or achieved some status with respect to the issuer 110. For example, the issuer 110 may be an insurance company, and the verifiable credential 130 may be proof that the holder 120 has a policy associated with the insurance company. As another example, the issuer 110 may be a state motor vehicle agency and the verifiable credential 130 may be proof that the holder 120 meets the requirements for a driver's license in that state. As another example, the issuer 110 may be an employer and the verifiable credential 130 may be proof that the holder 120 is an employee and therefore eligible for a wellness program offered by a third party. Other examples and use cases are described further below.

The holder 120 may be a computing device such as a smartphone or tablet computer associated with the individual entitled to the verifiable credential 130. In some embodiments, the holder 120 may execute an application or app (e.g., wallet app) that stores and manages the verifiable credential 130 on his/her computing device. Depending on the embodiment, the holder 120 may be associated with a decentralized identifier ("DID") that uniquely identifies the holder 120. The issuer 110 may or may not know the identity of the holder 120 when providing the verifiable credential 130.

On request of the holder 120 (or automatically in response to the holder 120 meeting one or more requirements or performing one or more tasks), the issuer 110 may generate a verifiable credential 130 for the holder 120. The verifiable credential 130 may be a digital certificate signed using a private key associated with the issuer 110. The verifiable credential 130 may further include a plurality of attributes that includes values such as a DID of the issuer 110, the DID of the holder 120, as well as descriptive data about the verifiable credential 130, such as a description of the status or achievement associated with the verifiable credential 130. For example, if the verifiable credential 130 is proof of participation in an insurance plan, the attributes may include the name of the insurance plan and a co-pay or deductible associated with the insurance plan. The attributes may also include an identifier that uniquely identifies the verifiable credential 130.

To facilitate the generation of verifiable credentials 130, the issuer 110 may generate and store verification data 115 that may be used by verifiers 140 to verify all of the verifiable credentials 130 generated by the issuer 110. In some embodiments, the verification data 115 may include a public DID 116, a definition 117, a schema 118, and a key 119. More or fewer components may be part of the verification data 115.

The public DID 116 may be the DID associated with the issuer 110. The key 119 may be a public key associated with the issuer 110. The public key 119 may be part of the key pair that includes the private key used by the issuer 110 to digitally sign the verifiable credential 130 generated by the issuer 110. The schema 118 may identify the attributes that are expected in the verifiable credential 130. The definition 117 may describe the values that are acceptable for the attributes of the schema. Depending on the embodiment, the attributes may include a unique identifier of verifiable credential, and the DID of the issuer 110.

The issuer 110 may store the verification data 115 at a public datastore 125. In some embodiments, the public datastore 125 may be a blockchain-based cryptographic ledger. Other types of datastores may be supported.

The issuer may generate a verifiable credential 130 according to the stored verification data 115. In particular, the verifiable credential 130 may include attributes and values that correspond to the schema 118 and definition 117. In addition, the verifiable credential 130 may be signed using a private key that corresponds to the key 119 of the verification data 115.

After generating the verifiable credential 130, the issuer 110 may transmit the verifiable credential 130 to the holder 120 through the network 190. The holder 120 may then store the verifiable credential 130 on the computing device (e.g., smart phone) associated with the holder 120.

At a later time, the holder 120 may desire to present the verifiable credential 130 to a verifier 140. The verifier 140 may be an entity who has an interest in verifying the variable credentials 130 associated with holders 120 in order to provide some benefit or privilege to the holders 120. For example, the verifiable credential 130 may be a proof of vaccination, and the verifier 140 may be a restaurant that wants to restrict entry to those holders 120 that can prove they were vaccinated. As another example, the verifier 140 may be an insurance company who would like to provide a discount to holders 120 that can prove that they have been participating in an employee wellness program.

The holder 120 may provide their verifiable credential 130 to the verifier 140. Depending on the embodiment, the holder 120 may provide the verifiable credential 130 to the verifier 140 electronically through the network 190. For example, the app or application on the mobile device of the holder 120 may display a QR code or other code that when scanned by the verifier 140, causes the verifier 140 to download and receive the verifiable credential 130.

Upon receiving the verifiable credential 130, the verifier 140 may retrieve the verification data 115 from the public datastore 125. In some embodiments, the verifiable credential 130 may include a link or pointer to the verification data 115 on the public datastore 125. Alternatively, the verifier 140 may retrieve the verification data 115 using the public DID 116 associated with the issuer 110 and included in the verifiable credential 130.

After retrieving the verification data 115, the verifier 140 may verify the verifiable credential 130 using the verification data 115. Initially, verifier 140 may verify the verifiable credential 130 using the key 119. If the key 119 is able to successfully decrypt the portion of the verifiable credential 130 that is digital signed using the key 119, then the verifier 140 may be ensured that the verifiable credential 130 was in fact signed by the issuer 110.

As another verification step, the verifier 140 may use the schema 118 and the definition 117 to determine whether the verifiable credential 130 is in the format described by the schema 118 and definition 117 (i.e., are all of the expected attributes present with the expected values?). The verifier 140 may further use the schema 118 and definition 117 to extract any data from the verifiable credential 130. For example, where the verifiable credential 130 is a concert ticket, the verifiable credential 130 may include attributes that describe the date of the concert, and the row and seat associated with the concert ticket.

In some embodiments, the issuers 110 may be able to withdraw a verifiable credential 130 once issued. In these embodiments, each issuer 110 may maintain a list or registry of the verifiable credential 130 that were withdrawn on the public datastore 125. The list may use the unique identifiers that are associated with each verifiable credential 130.

An issuer 110 may desire to withdraw verifiable credential 130 for a variety of reasons. Examples include expiration of the verifiable credential 130 (e.g., an issuer 110 may issue a verifiable credential 130 that is only valid for a day, week, or year), failure to pay for the verifiable credential 130 (e.g., a user may pay a monthly to use the credential 130), and a change of circumstances of the holder 120 (e.g., a user may be no longer employed by the issuer 110 and may no longer be eligible for the credential 130).

In addition, a holder 120 may lose the verifiable credential 130 and may request a new verifiable credential 130 from the issuer 110. The issuer 110 may provide the new verifiable credential 130 and may add an identifier of the lost verifiable credential 130 to the list of revoked verifiable credentials 130. For example, a holder 120 may lose the smartphone or mobile device that stores the verifiable credential 130 and may request that a new verifiable credential 130 be sent to a replacement device.

When the verifier 140 receives a verifiable credential 130, after verifying the credential 130 using the verification data 115, the verifier 140 may check if the identifier of the credential 130 is on the list of withdrawn credentials 130 associated with the issuer 110. If so, the verifier 140 may reject the verifiable credential 130.

In some embodiments, for holders 120, rather than provide an entire verifiable credential 130 to a verifier 140 for validation purposes, the holder 120 may instead provide a proof presentation 135 that is generated by the holder 120 from the verifiable credential 130. The proof presentation 135 may include a subset of the attributes of the verifiable credential and may be validated by the verifier 140 using the verification data 115 as described above. As may be appreciated, depending on what information is being requested by a verifier 140, the holder 120 may desire to only present the minimum information requested by the verifier 140.

For example, with respect to a verifiable credential 130 representing a driver's license, a verifier 140 may ask a holder 120 to verify that they are over eighteen years old. Rather than present the entire verifiable credential 130 to the verifier 140, the holder 120 (or wallet application associated with the holder 120) may generate a proof presentation 135 that indicates that they are over eighteen years old, but omits attributes that are irrelevant such as height, address, sex, date or birth, and eye color.

As may be appreciated, while the verifiable credentials 130 described herein are very useful, creating and using a new verifiable credential 130 by an issuer 110 is difficult and time consuming. Accordingly, to facilitate the creation of new verifiable credentials 130, the environment 100 further includes a credential application creator 150 that allows an issuer 110 to quickly and easily create a new type of verifiable credential 130 according to preferences and selections made by the issuer 110. The credential application creator 150 may be implemented using one or more general purpose computing devices such as the computing device 500 illustrated with respect to FIG. 500.

The credential application creator 150 may provide a graphical user interface, which an issuer 110 may use to create a verifiable credential 130. The issuer 110 may use the graphical user interface to select the attributes for the verifiable credential 130 and to provide values, or value ranges, for each attribute. Example attributes may include a name of the credential 130, a name or DID of the issuer 110, a name or DID of the holder 120 of the credential 130, the benefit or status associated with credential 130, whether or not the credential 130 is revocable or expires, and whether or not the credential 130 supports messaging. Other attributes may be specific to the intended use of the credential 130. For example, credential 130 that is for a concert ticket may include attributes for the seat number, date, and artist. A credential 130 that is a driver's license may include attributes for the name, address, date of birth, sex, and height of the holder 120.

The issuer 110 may further use the graphical user interface to provide a key 119 to the credential application creator 150, and to indicate a public datastore 125 that the issuer 110 would like to use to store the verification data 115. Where no public datastore 125 is indicated, the credential application creator 150 may use a default public datastore 125.

The credential application creator 150 may generate verification data 115 for the desired verifiable credential 130. The verification data 115 may include a schema 118 and definition 117 that are generated based on the information provided to the credential application creator 150 through the graphical user interface 150. The verification data 115 may further include the key 119 provided by the issuer 110 and the public DID 116 of the issuer 110.

The credential application creator 150 may then generate a credential issuing application 155 that can generate and issue verifiable credentials 130 according to the verification data 115 stored on the public datastore 125. The credential application creator 150 may then provide the application 155 to the issuer 110 or any other entity that may be authorized to generate the verifiable credentials 130 on behalf of the issuer 110.

In addition, in some embodiments, the credential application creator 150 may further generate one or more credential verification applications 157. Each credential verification application 157 may be configured to verify the verifiable credentials 130 generated using the verification data 115. The credential verification applications 157 may be distributed to verifiers 140 that wish to accept or verify the corresponding verifiable credential 130.

For example, an insurance company may use the credential application creator 150 to create a verifiable credential 130 for members that includes attributes such as account number, member name, and plan details such as deductible and co-pay information. The credential application creator 150 may generate a credential issuing application 155 that the insurance company may use to generate verifiable credentials 130 that are distributed to each member. In addition, the credential application creator 150 may generate credential verification applications 157 that the insurance company issuer 110 may distribute to medical providers (e.g., hospitals, clinics, and doctors' offices) who may want to verify the patients who present the credential 130 in exchange for medical services.

The verifiable credentials 130 described herein may support the following use cases. Note that these are only example use cases and are not meant to be an exhaustive list; additional use cases may be supported.

One example use case is as a proof of insurance. In such a case, the issuer 110 of the credentials 130 may be an insurance company. The holder 120 may be a patient. The verifier 140 may be a medical provider. The credentials 130 would serve as proof to the medical provider that the patient holder 120 is entitled to medical coverage through the insurance company.

Another example use case is as a proof of eligibility. In such a case, the issuer 110 of the credentials 130 may be an employer. The holder 120 may be an employee of the employer. The verifier 140 may be a third party provider of the employer-sponsored benefits for the employer. The credentials 130 would serve as proof to the verifier 140 that the employee-holder is eligible for employer-sponsored benefits, without having to make the employer aware that the employee is making use of such benefits.

Another example use case is as a proof of prior authorization to receive a procedure. In such a case, the issuer 110 of the credentials 130 may be an insurance company, a medical provider, or a clearinghouse. The holder 120 may be a patient. The verifier 140 may be a medical provider or an insurance company. The credentials 130 would serve as proof that the patient holder 120 received prior authorization for a particular medication or procedure.

Another example use case is as a proof of consent. In such a case, the issuer 110 of the credentials 130 may be a patient. The holder 120 may be any non-covered entity not subject to HIPAA regulations, such as a health-tracking application, that the patient would like to provide their medical records to. The verifier 140 may be a medical provider or an insurance company who has access to the medical records of the patient. The credentials 130 would serve as proof that the patient holder 120 consents to the non-covered entity receiving the medical records of the patient from the medical provider or insurance company.

Another example use case is as a proof of prescription. In such a case, the issuer 110 of the credentials 130 may be a medical provider. The holder 120 may be a patient of the medical provider. The verifier 140 may be a pharmacy. The credentials 130 would serve as proof that the patient holder 120 is entitled to a particular prescription medication identified by the credential 130, and that the medical provider prescribed the prescription medication.

Another example use case is as a proof of self. In such a case, the issuer 110 of the credentials 130 may be a government agency. The holder 120 may be an individual. The verifier 140 may be any entity who may need proof from an individual that they are who they say they are. The credentials 130 in this case would serve as a form of government identification and as proof that a holder 120 is who they purport to be. An individual holder 120 could download the credentials 130 to their smartphone and could provide them to anyone (e.g., verifier 140) who requests identification.

Another example use case is as a proof of compliance. In such a case, the issuer 110 of the credentials 130 may be a medical or service provider. The holder 120 may be an individual. The verifier 140 may be any entity who has an interest in the individual complying with a regiment or service provided by the medical or service provider. The credentials 130 in this case would serve as proof that the holder 120 did, or is complying with, the regiment or service provided by the medical or service provider. For example, an individual may be asked by an entity such as an employer or court to participate in a drug or alcohol cessation program. The provider of the program may issue credentials 130 to the holder 120 that proves that they are participating in the drug or alcohol cessation program.

Another example use case is as a proof of certification or degree. In such a case, the issuer 110 of the credentials 130 may be a professional board or educational institution. The holder 120 may be an individual. The verifier 140 may be any entity who may need proof from the individual that he/she has a particular certification or a degree. The credentials 130 in this case would serve as proof that the holder 120 met the requirements of a particular certification or degree. For example, a high school may issue credentials 130 to graduates that can be used to prove to employers that they graduated high school and have a high school diploma. In another example, a medical board may issue credentials 130 to a doctor that indicate that the holder has completed his/her required board exams.

Another example use case is as a proof of training. In such a case, the issuer 110 of the credentials 130 may be an educational institution or other entity that provides training. The holder 120 may be an individual. The verifier 140 may be any entity who may need proof from the individual that he/she has participated in a particular training. The credentials 130 in this case would serve as proof that the holder was trained by the entity. For example, an entity such as the Red Cross may issue credentials 130 to individuals after they take a CPR class. The credentials 130 could be presented to verifiers 140 such as a pool or daycare where the holder 120 is seeking employment.

Another example use case is as a proof of receipt. In such a case, the issuer 110 of the credentials 130 may be a retailer that sells an item. The holder 120 may be an individual that purchased the item. The verifier 140 may be the retailer that sells the item or a third party that processes warrantee claims for the retailer. The credentials 130 in this case would serve as proof that the holder 120 purchased the item from the retailer. The holder 120 could present the credentials 130 as proof that they purchased the item when making a claim under a warranty, or when redeeming a rebate offered by the retailer.

Another example use case is as a proof of bank account control. In such a case, the issuer 110 of the credentials 130 may be a financial institution such as a bank. The holder 120 may be an individual that has an account with the bank. The verifier 140 may be an entity that wants to make a payment to the account of the holder 120. The credentials 130 in this case would serve as proof that the holder 120 is in control of the bank account. Currently such proof is provided by the verifier 140 depositing a few cents into the account, and then having the holder 120 verify the amount that was deposited.

Figure 2:
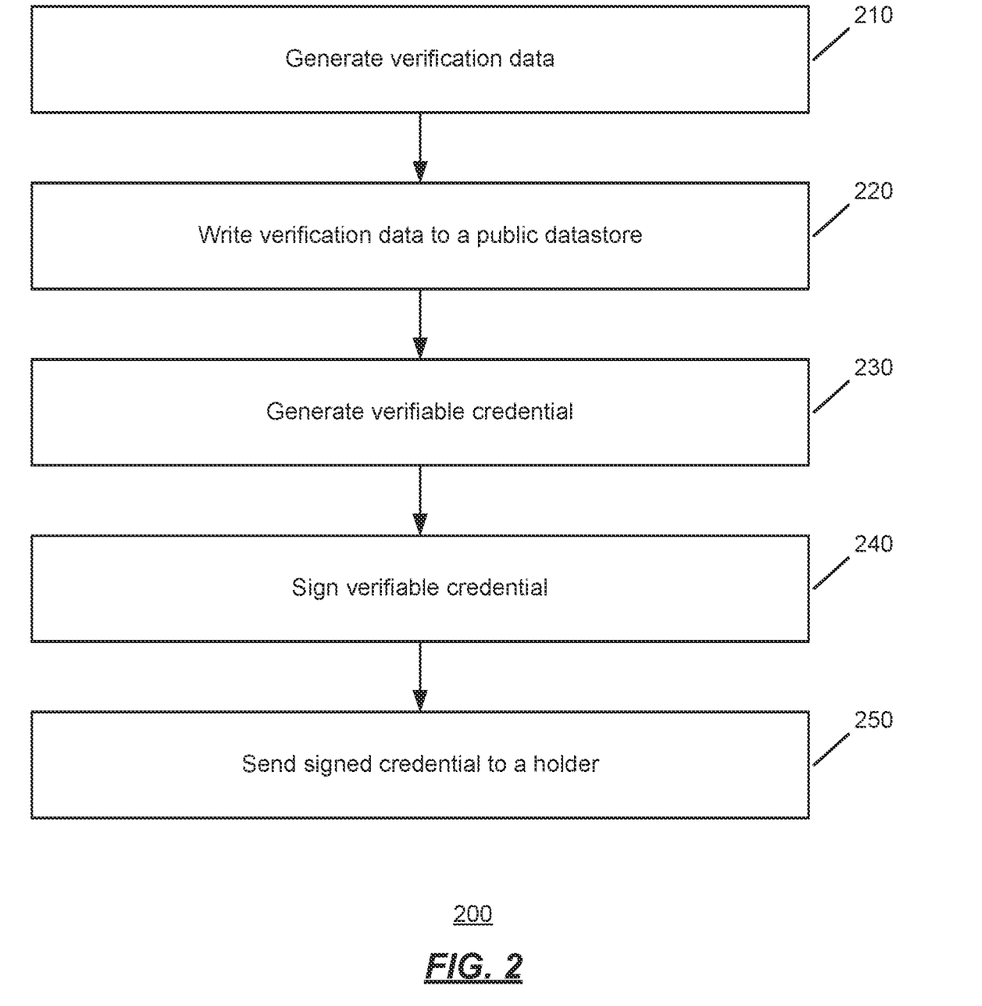
FIG. 2 is an illustration of an example method for generating and providing verifiable credentials.

FIG. 2 is an illustration of an example method for generating verifiable credentials 130. The method 200 may be implemented by the issuer 110.

At 210, verification data is generated. The verification data 115 may be generated by the issuer 110 and may be used by one or more verifiers 140 to verify a verifiable credential 130. In some embodiments, the verification data 115 may include, but is not limited to, a public DID 116 of the issuer 110, a schema 118 and definition 117 that describe the expected contents or format of the verifiable credential 130, and a key 119. The key 119 may be a public key associated with the issuer 110 and may be part of a key pair associated with the issuer 110 of the verifiable credential 130.

At 220, the verification data is written to a public datastore. The verification data 115 may be written to a public datastore 125 by the issuer 110. The public datastore 125 may be a blockchain ledger, for example. Other datastores may be used. At a later time, when the holder 120 presents the verifiable credential 130 to a verifier 140, the verifier 140 may retrieve the verification data 115 from the public datastore 125 and verify the verifiable credential 130 using the verification data 115.

At 230, a verifiable credential is generated. The verifiable credential 130 may be generated by the issuer 110. The verifiable credential 130 may include a plurality of attributes and each attribute may have one or more more values according to the schema 118 and definition 117 of the verification data 115 written to the public datastore 125. The verifiable credential 130 may be proof that the holder 120 met some requirement or has some status with respect to the issuer 110. For example, the issuer 110 may be an employer and the verifiable credential 130 may indicate that the holder 120 is an employee of the employer. As another example, the issuer 110 may be an insurance company and the verifiable credential 130 may indicate that the holder 120 has an insurance policy with the issuer 110.

At 240, the verifiable credential is signed. The verifiable credential 130 may be signed using an encryption key associated with the issuer 110. The key may be a private key that is part of the key pair associated with the issuer 110 described above.

At 250, the signed credential is sent to a holder. The signed verifiable credential 130 may be sent by the issuer 110 to the holder 120. The holder 120 may then store the signed verifiable credential 130 on a computing device or smartphone associated with the holder 120.

Figure 3:
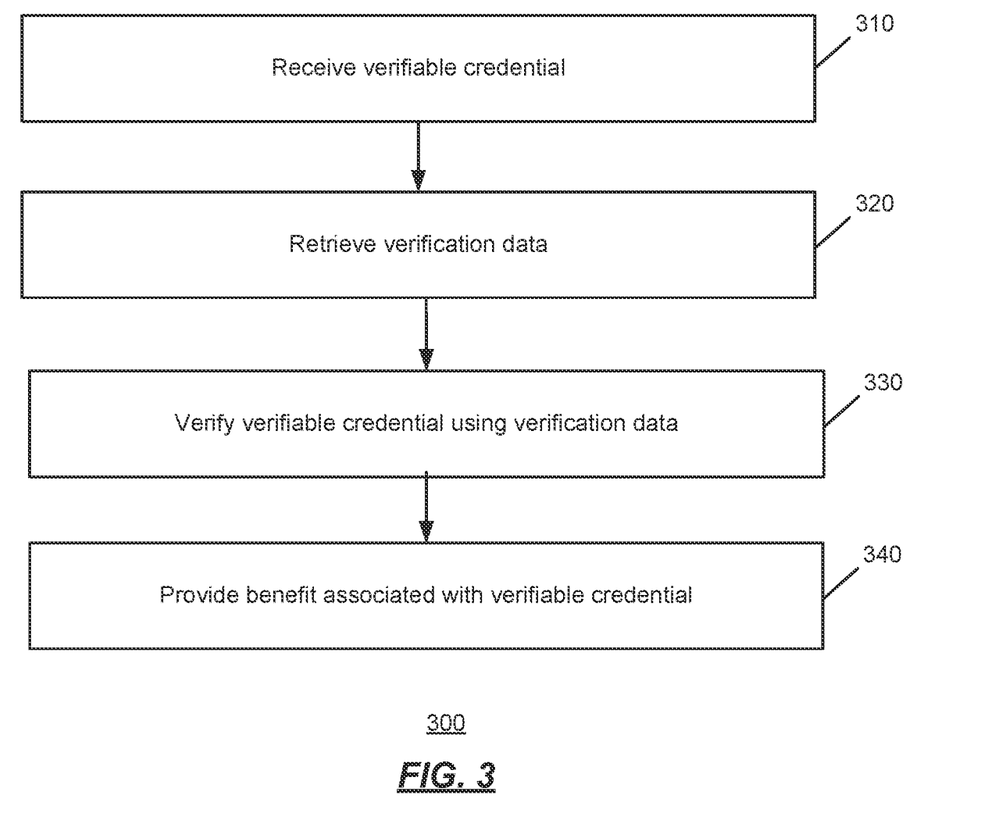
FIG. 3 is an illustration of an example method for receiving and verifying verifiable credentials.

FIG. 3 is an illustration of an example method for verifying received verifiable credentials. The method 300 may be implemented by a verifier 140.

At 310, a verifiable credential is received. The verifiable credential 130 may be received by a verifier 140 through the network 190 from a holder 120. For example, the holder 120 may use an app on their smartphone to send the verifiable credential 130 (or a copy thereof) to the verifier 140.

At 320, verification data is retrieved. The verification data 115 may be retrieved by the verifier 140 from a public datastore 125. In some embodiments, the verifiable credential 130 may identify the location of the verification data 115 on the public datastore 125. Depending on the embodiment, the verification data 115 may include one or more more of a public DID 116 associated with the issuer 110, a definition 117, a schema 118, and a key 119.

At 330, the verifiable credential is verified using the retrieved verification data. The verifiable credential 130 may verified by the verifier 140. In some embodiments, the verifiable credential 130 may be verified using the key 119. If the signature associated with the verifiable credential 130 can be verified using the key 119 (indicating that the signature was signed using the corresponding private key), then the verifiable credential 130 is verified. In addition, the verifier 140 may also verify the verifiable credential 130 using the schema 118 and definition associated with the verification data 115.

At 340, a benefit associated with the verifiable credential is provided. The benefit may be provided by the verifier 140 (or another entity using the verifier 140 to verify credentials 130). The benefit may be a good or service and may include medical services (e.g., the verifiable credential 130 may attest that the holder 120 has insurance or is entitled to a prescription drug), consumer goods (e.g., the verifiable credential 130 may attest that the holder 120 has has paid for an item or has made a deposit on the item), and ticketed services (e.g., the verifiable credential 130 may serve as a ticket to a concert, movie, amusement part, or mode of travel). Other benefits may be supported.

Figure 4:
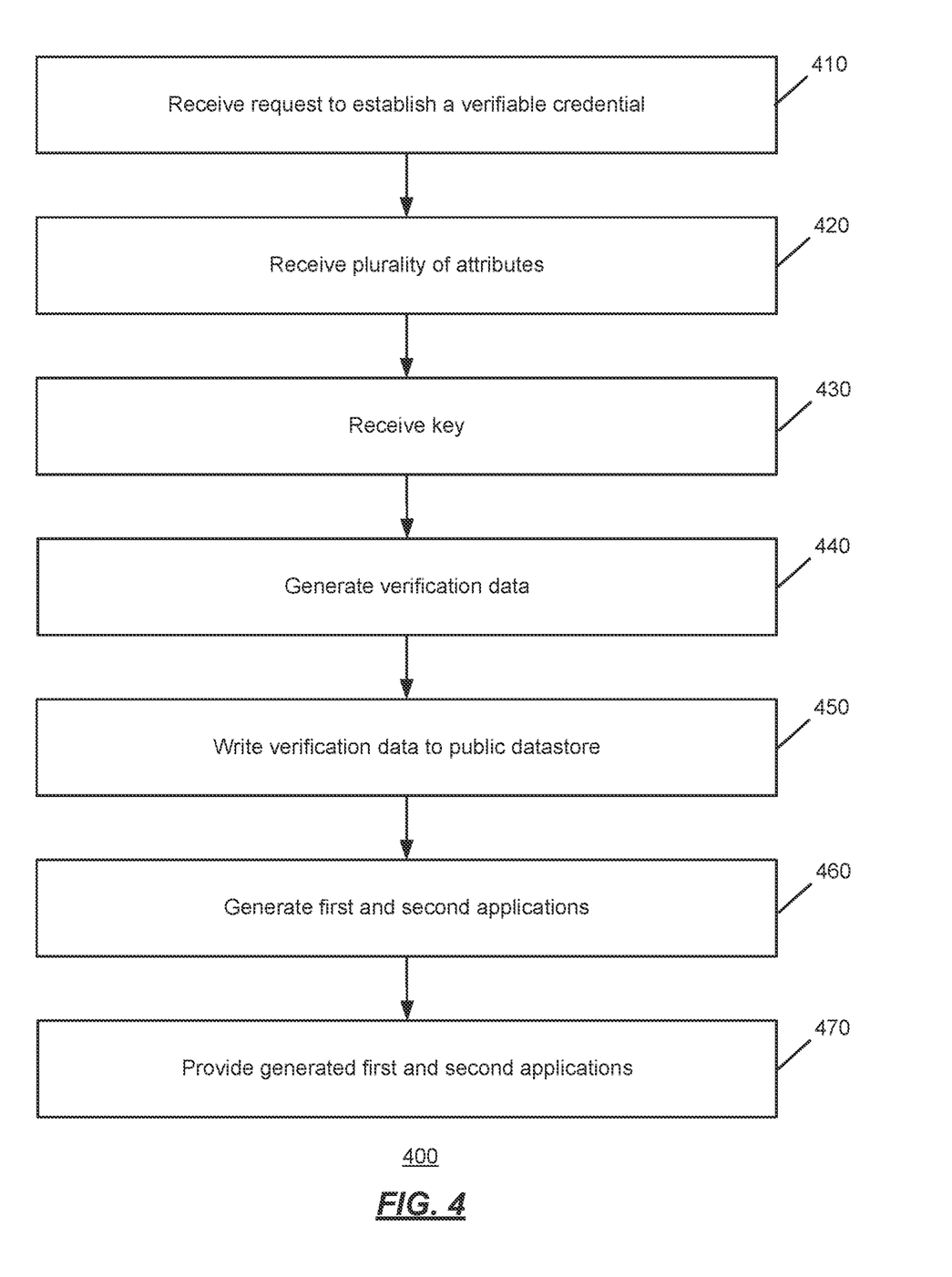
FIG. 4 is an illustration of an example method for creating applications that can issue and verify verifiable credentials.

FIG. 4 is an illustration of an example method 400 for creating applications that can issue and verify verifiable credentials. The method 400 may be implemented by the credential application creator 150.

At 410, a request to establish a verifiable credential is received. The request may be received by the credential application creator 150 from an issuer 110. The request may be received through a graphical user interface provided by the credential application creator 150. The issuer 110 may desire to begin issuing verifiable credentials 130 to holders 120 that can be used by the holder 120 to provide proof of status or entitlement to a benefit to one or more verifiers 140. The credential application creator 150 may be used to generate a credential issuing application 155 than can be used by the issuer 110 to generate credentials 130, and to generate a credential verification application 157 that can be used by one or more verifiers 140 to verify the generated credentials 130.

At 420, a plurality of attributes is received. The plurality of attributes may be received by the credential application creator 150 from the issuer 110 through the graphical user interface provided by the credential application creator 150. The plurality of attributes may be attributes that define the verifiable credential 130 and may include attributes such as the name of the credential, the name or DID of the issuers 110, the name or DID of the holder 120, an indication of the status or benefit associated with the verifiable credential 130, an expiration time associated with the verifiable credential 130, whether or not the verifiable credential 130 is revocable, and whether or not the verifiable credential 130 supports messaging.

Other information about the desired verifiable credential 130 may be included in the attributes. In addition, the issuer 110 may identify the public datastore 125 that they would like to store the verification data 115 associated with the verifiable credential 130. Alternatively, a default or previously selected public datastore 125 may be used.

At 430, a key is received. The key may be a public key 119 associated with the issuer 110 and may be received by the credential application creator 150 from the issuer 110 through the graphical user interface.

At 440, verification data is generated. The verification data 115 may be generated by the credential application creator 150. The verification data 115 may include the received key 119 and a schema 118 and definition 117 that are generated based on the plurality of attributes provided by the issuer 110 to the credential application creator 150.

At 450, the verification data is written to a public datastore. The verification data 115 may be written to the public datastore 125 by the credential application creator 150.

At 460, a first application and a second application are generated. The first application and second application may be generated by the credential application creator 150. The first application may be a credential issuing application 155 that is used by the issuer 110 to issue verifiable credentials 130 to holders 120 according to the attributes and preferences provided by the issuer 110 to the credential application creator 150. The second application may be the credential verification application 157 that may be used to verify the verifiable credentials 130 (or corresponding proof presentation) using the verification data 115 stored on the public datastore 125.

At 470, the first application and the second application are provided. The first application may be provided to the issuer 110 by the credential application creator 150. The second application may be provided to one or more verifiers 140 by the credential application creator 150. The issuer 110 may then begin generating verifiable credentials 130 for holders 120 using the first application and the private key associated with the issuer 110.

Figure 5:
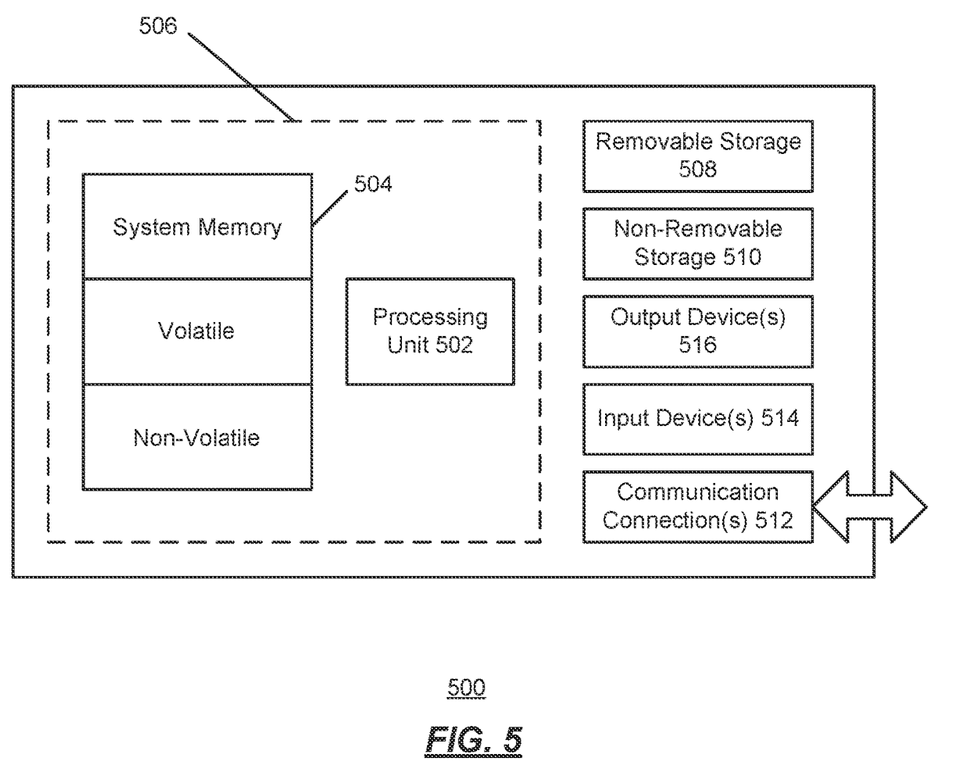
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, by one or more processors, a request to establish a verifiable credential from an issuer;
   in response to the request, retrieving, by the one or more processors, a plurality of attributes for the verifiable credential;
   receiving, by the one or more processors, a key associated with the issuer;
   generating, by the one or more processors, verification data for the verifiable credential using the plurality of attributes and the key;
   writing, by the one or more processors, the verification data to a public datastore; and
   generating, by the one or more processors, a first application that generates the verifiable credential according to the plurality of attributes and the key, wherein the verifiable credential is verified by retrieving the verification data from the public datastore and decrypting a portion of the verifiable credential with the verification data.

2. The computer-implemented method of claim 1, further comprising:
   providing, by the one or more processors, the generated first application to the issuer.

3. The computer-implemented method of claim 1, further comprising:
   generating, by the one or more processors, a second application that retrieves the verification data from the public datastore and verifies the verifiable credential using the retrieved verification data.

4. The computer-implemented method of claim 3, further comprising:
   providing, by the one or more processors, the generated second application to a verifier.

5. The computer-implemented method of claim 1, further comprising:
   generating, by the one or more processors, a graphical user interface;
   transmitting, by the one or more processors, the graphical user interface to a client device for display; and
   receiving, by the one or more processors, the plurality of attributes for the verifiable credential from the client device via the graphical user interface.

6. The computer-implemented method of claim 1, wherein the verifiable credential is associated with a benefit or status associated with a holder of the verifiable credential.

7. The computer-implemented method of claim 1, wherein the plurality of attributes comprises a revocable attribute.

8. The computer-implemented method of claim 1, wherein generating the verification data for the verifiable credential comprises generating, by the one or more processors, schema and a definition from the plurality of attributes.

9. The computer-implemented method of claim 1, further comprising receiving, by the one or more processors, a selection of the public datastore from the issuer.

10. The computer-implemented method of claim 1, wherein the public datastore comprises a blockchain or distributed ledger.

11. One or more non-transitory computer-readable media storing computer executable instructions that when executed by one or more processors cause the one or more processors to:
- receive a request to establish a verifiable credential from an issuer;
- in response to the request, retrieve a plurality of attributes for the verifiable credential;
- receive a key associated with the issuer;
- generate verification data for the verifiable credential using the plurality of attributes and the key;
- write the verification data to a public datastore; and
- generate a first application that generates the verifiable credential according to the plurality of attributes and the key, wherein the verifiable credential is verified by retrieving the verification data from the public datastore and decrypting a portion of the verifiable credential with the verification data.

12. The one or more non-transitory computer-readable media of claim 11, further comprising computer executable instructions that when executed by the one or more processors cause the one or more processors to:
- provide the generated first application to the issuer.

13. The one or more non-transitory computer-readable media of claim 11, further comprising computer executable instructions that when executed by the one or more processors cause the one or more processors to:
- generate a second application that retrieves the verification data from the public datastore and verifies the verifiable credential using the retrieved verification data.

14. The one or more non-transitory computer-readable media of claim 13, further comprising computer executable instructions that when executed by the one or more processors cause the one or more processors to:
- provide the generated second application to a verifier.

15. The one or more non-transitory computer-readable media of claim 11, further comprising computer executable instructions that when executed by the one or more processors cause the one or more processors to:
- generate a graphical user interface;
- transmit the graphical user interface to a client device for display; and
- receive the plurality of attributes for the verifiable credential from the client device via the graphical user interface.

16. The one or more non-transitory computer-readable media of claim 11, wherein the verifiable credential is associated with a benefit or status associated with a holder of the verifiable credential.

17. The one or more non-transitory computer-readable media of claim 11, wherein the plurality of attributes comprises a revocable attribute.

18. The one or more non-transitory computer-readable media of claim 11, wherein generating the verification data for the verifiable credential comprises generating a schema and a definition from the plurality of attributes.

19. The one or more non-transitory computer-readable media of claim 11, further comprising computer executable instructions that when executed by the one or more processors cause the one or more processors to receive a selection of the public datastore from the issuer.

20. A system comprising:
- one or more processors; and
- one or more non-transitory computer-readable media storing computer executable instructions that when executed by the one or more processors cause the one or more processors to:
  - receive a request to establish a verifiable credential from an issuer;
  - in response to the request, retrieve a plurality of attributes for the verifiable credential;
  - receive a key associated with the issuer;
  - generate verification data for the verifiable credential using the plurality of attributes and the key;
  - write the verification data to a public datastore; and
  - generate a first application that generates verifiable credential according to the plurality of attributes and the key, wherein verifiable credential is verified by retrieving the verification data from the public datastore and decrypting a portion of the verifiable credential with the verification data.

* * * * *